United States Patent
Cho

(10) Patent No.: US 6,330,734 B1
(45) Date of Patent: Dec. 18, 2001

(54) HINGE ASSEMBLY FOR AUTOMOBILE HOODS

(75) Inventor: Sun-Hyung Cho, Ulsan (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/472,360

(22) Filed: Dec. 23, 1999

(30) Foreign Application Priority Data

Sep. 13, 1999 (KR) .................................................. 99-39002

(51) Int. Cl.$^7$ .............................. E05D 11/06; E05D 11/00
(52) U.S. Cl. ................................ 16/376; 16/370; 16/371; 16/366; 16/222; 16/223; 180/69.21; 180/274
(58) Field of Search ............................ 16/376, 370, 366, 16/371, 374, 222, 223; 180/69.2, 69.21, 274; 296/76

(56) References Cited

U.S. PATENT DOCUMENTS

| | | | |
|---|---|---|---|
| 4,012,807 | * | 3/1977 | Kern ........................................ 16/375 |
| 4,093,290 | * | 6/1978 | Pearson .................................. 293/38 |
| 4,249,632 | * | 2/1981 | Lucchini et al. ..................... 180/274 |
| 4,946,002 | * | 8/1990 | Vu et al. ............................... 180/271 |
| 5,339,494 | * | 8/1994 | Esau et al. ............................. 16/374 |
| 5,557,829 | * | 9/1996 | Schoen et al. ......................... 16/371 |
| 5,697,467 | * | 12/1997 | Howard .................................. 16/371 |
| 6,182,782 | * | 2/2001 | Matsuura et al. ................. 280/730.1 |

FOREIGN PATENT DOCUMENTS

WO-00/69709 * 11/2000 (WO) .

* cited by examiner

*Primary Examiner*—Chuck Y. Mah
(74) *Attorney, Agent, or Firm*—Christie, Parker & Hale, LLP

(57) ABSTRACT

A hinge assembly has a first hinge rod unit and a second hinge rod unit. The first hinge rod unit is fixed at its upper end to the bottom of a hood by means of a first hinge pin and at its lower end to a fender apron by means of a second hinge pin. The second hinge rod unit is fixed at its upper end to the bottom of the hood by means of a third hinge pin and at its lower end to the fender apron by means of a fourth hinge pin. The first and third hinge pins are spaced apart by a first interval, while the second and fourth hinge pins are spaced apart by a second interval longer than the first interval. Each of the first and second hinge rod units comprises a first hollow hinge rod, a second hinge rod slidably inserted into the first hinge rod, and a means for locking the second hinge rod to the first hinge rod, that is breakable when a force greater than a predetermined certain amount is applied.

12 Claims, 4 Drawing Sheets

HINGE ASSEMBLY FOR AUTOMOBILE HOODS

FIELD OF THE INVENTION

The present invention relates, in general, to hinge assemblies for automobile hoods and, more particularly, to a hinge assembly for automobile hoods for absorbing a shock during a collision with a pedestrian.

BACKGROUND OF THE INVENTION

As well known to those skilled in the art, a hood of an automobile refers to the hinged, openable part of an automobile body covering an engine room.

As shown in FIG. 5, the construction of an automobile body related to the present invention includes an engine room "E" defined by fenders "F" and a radiator support panel "S", a hood 51 openably mounted at a cowl panel side of the engine room "E" by means of a hood hinge assembly 50, a latch means consisting of a hood latch assembly 52 for maintaining a latched state at a radiator support panel side, a hood striker (not shown) for engaging with the hood latch assembly 52 at the hood 51 and a hood stay damper 53 for supporting the opened hood 51.

As illustrated in FIGS. 5 and 6, the hood hinge assembly 50 consists of a first hinge piece 54 fixed at an upper surface of a fender apron "FA", a second hinge piece 56 fixed at a lower surface of the hood 51, and a hinge pin 55 rotatably connecting the first hinge piece 54 with the second hinge piece 56.

The hood 51 consists of an inner panel 51' and an outer panel 51". The space "D" between the inner panel 51' and the outer panel 51" is about 15 mm. When the hood 51 is closed, a space "D1" between the hood hinge assembly 50 and the fender apron "FA" is about 35 mm, a space D2 between the outer panel 51" of the hood 51 and the fender apron "FA" is about 50 mm.

When an automobile having the above-described construction collides with a pedestrian, the pedestrian receives a shock having a force F1 when he crashes into the hood 51. In more detail, the pedestrian initially collides with the bumper of the automobile at the lower half of his body and, thereafter, the pedestrian falls into the hood 51 and comes into collision-contact with the hood 51.

In such a case, while the hood 51 is crushed and broken, the hood 51 absorbs the impact force applied by the pedestrian, thus reducing the shock applied to the pedestrian. In other words, while the space "D" between the inner panel 51' and the outer panel 52' and the space "D1" between the hood hinge assembly 50 and the fender apron "FA" is decreased, the shock applied to the pedestrian is reduced.

However, according to prior art, because the impact is absorbed using the space "D" between the inner panel 511 and the outer panel 52' and the space "D1" between the hood hinge assembly 50 and the fender apron "FA" and both spaces total 50 mm, the impact absorbing effect is low.

Additionally, because the hood is made of metal having a high degree of rigidity and supported firmly by the hood hinge assembly, there is a limitation in reducing the shock applied to the pedestrian.

Because the conventional hood hinge is rotated around one hinge point, the size of the hood hinge assembly must be increased so as to enlarge the space between the hood and the fender apron. However, because there are limitations for making the hood hinge large, the enlargement of the space is limited by the restrictions in automobile design.

SUMMARY OF THE INVENTION

Accordingly, an object of the present invention is to provide a hinge assembly for automobile hoods, increasing a shock absorbing capability by enlarging the space between the hood hinge assembly and the fender apron.

Another object of the present invention is to provide a hinge assembly for automobile hoods that minimizes the shock applied to a pedestrian by allowing the hood and the hood hinge assembly to be separated when a pedestrian collides with an automobile.

In order to accomplish the above object, the present invention provides a hinge assembly for automobile hoods, comprising a first hinge rod unit. The first hinge rod unit is rotatably engaged at an upper end with a bottom of a hood by means of a first hinge pin. The first hinge rod unit is engaged at a lower end with a fender apron by means of a second hinge pin. The hinge assembly further comprises a second hinge rod unit. The second hinge rod unit is rotatably engaged at an upper end with the bottom of the hood by means of a third hinge pin. The second hinge rod unit is rotatably engaged at a lower end with the fender apron by means of a fourth hinge pin. The third hinge pin is spaced apart from the first hinge pin by a first interval, and the fourth hinge pin is spaced apart from the second hinge pin by a second interval longer than the first interval.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION

Figure 1A:
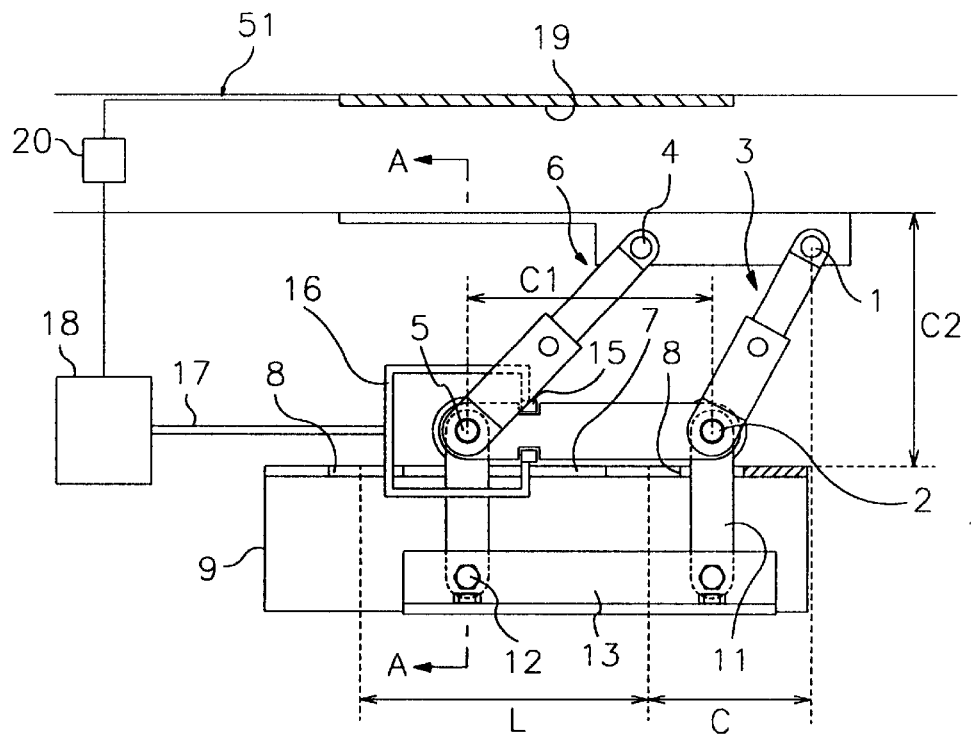
FIG. 1*a* is an enlarged partial section view showing a hinge assembly for automobile hoods according to the present invention mounted in an automobile when an impact is not applied to a hood.
Figure 1B:
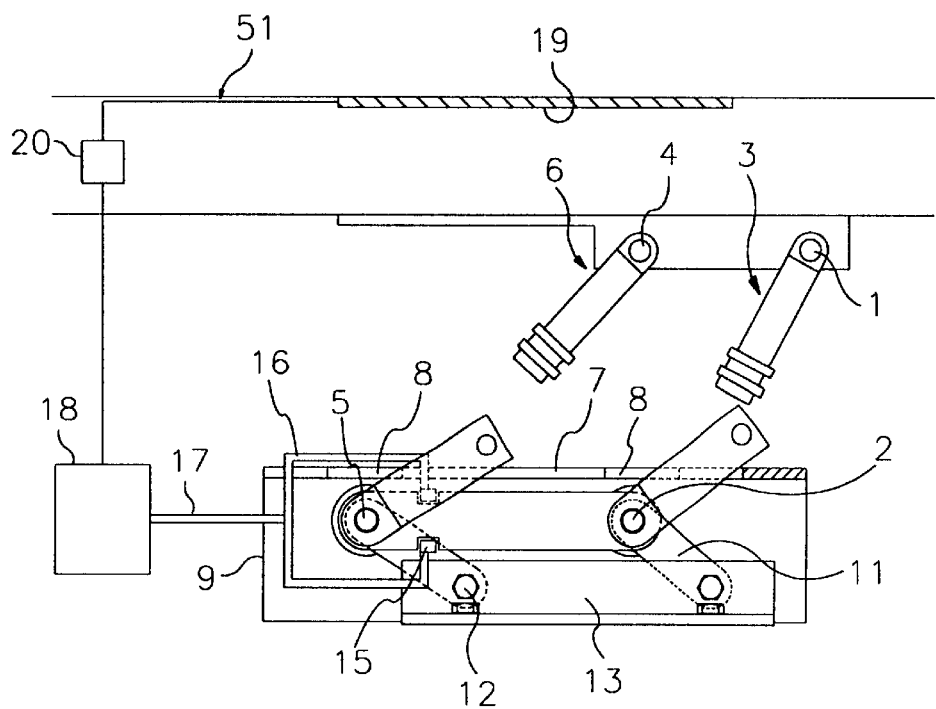
FIG. 1*b* is a view showing the hood hinge assembly of FIG. 1*a* when an impact is applied to the hood.
Figure 2:
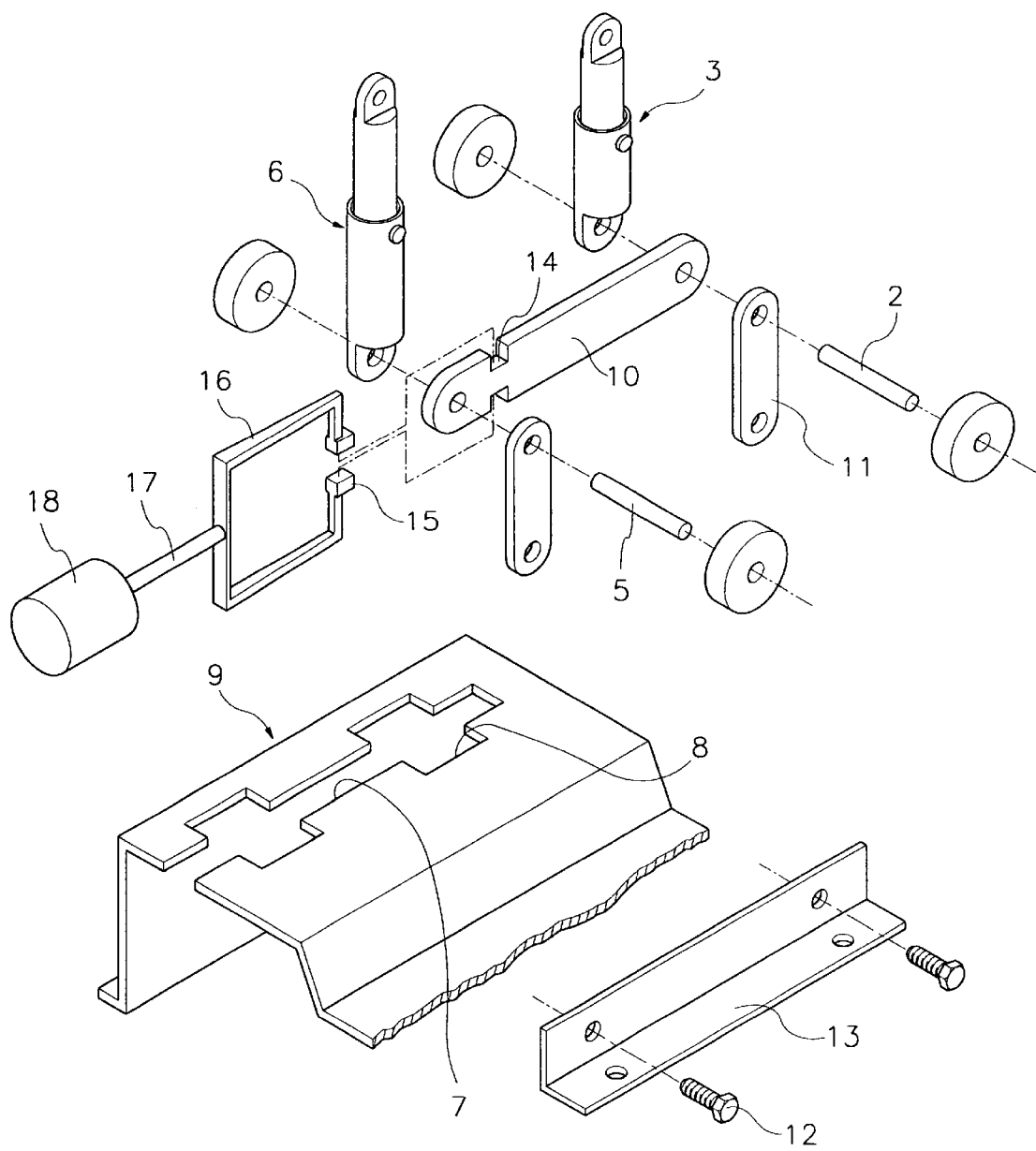
FIG. 2 is an exploded view of the hood hinge assembly of FIG. 1*a*.
Figure 3:
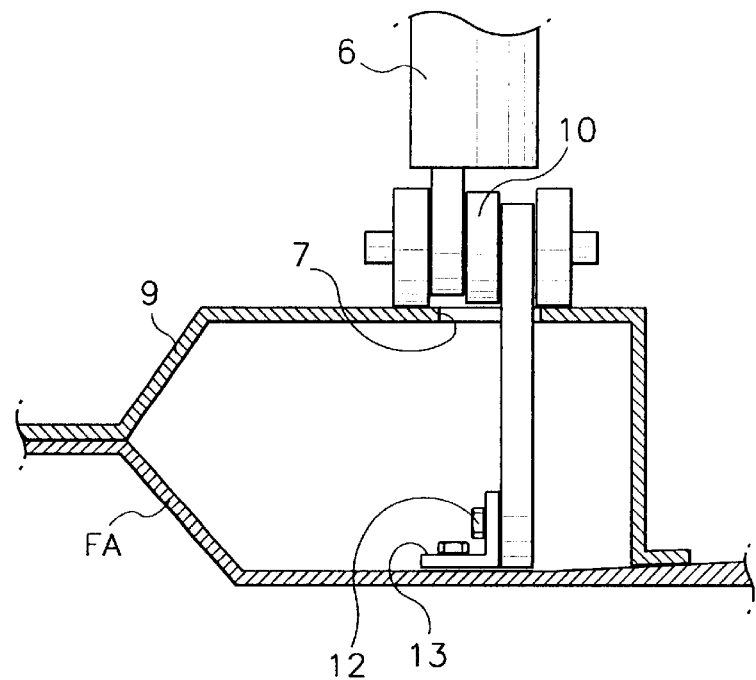
FIG. 3 is a cross section taken along line A—A of FIG. 1*a*.

As shown in FIGS. 1*a* to 3, a hinge assembly for automobile hoods comprises a first hinge rod unit 3 and a second hinge rod unit 6. The first hinge rod unit 3 is rotatably engaged at an upper end with the bottom of a hood 5 by means of a first hinge pin 1. The first hinge rod unit 3 is rotatably engaged at a lower end with a fender apron "FA" by means of a second hinge pin 2. The second hinge rod unit 6 is rotatably engaged at an upper end with the bottom of the hood 5 by means of a third hinge pin 4. The second hinge rod unit 6 is rotatably engaged at a lower end with the fender apron "FA" by means of a fourth hinge pin 5. In such a case, the third hinge pin 4 is spaced apart from the first hinge pin 1 by a first interval "C", while the fourth hinge pin 5 is spaced apart from the second hinge pin 2 by a second interval "C1" longer than the first interval "C". According to this embodiment, because the length of the first hinge rod unit 3 is different from the length of the second hinge rod unit 6 and the first interval "C" between the first hinge pin 1 and the third hinge pin 4 is different from the second interval "C1" between the second hinge pin 2 and the fourth hinge pin 5, the hood 51 is stopped at a position vertically spaced apart from the fender apron "FA" by the difference between the lengths of the first and second hinge rod units 3 and 6 (this is equal to the difference between the first interval "C" and the second interval "C1") while the hood 51 is closed, thereby enlarging the shock absorbing space.

In order to absorb the impact by lowering the first and second hinge rod units 3 and 6 when an impact is applied to the hood 51, for example, when a pedestrian comes into collision-contact with the hood 51, collapsing means is mounted between the lower ends of the first and second hinge rods units 3 and 6 and the fender apron "FA".

The collapsing means comprises a support bracket 9, a connecting member 10, pulling means and linking means. The support bracket 9 has a portion spaced apart from the fender apron "FA". The support bracket 9 is provided with a slit 7 at the portion spaced apart from the fender apron "FA", and is provided with two spaced-apart bracket holes 8 at the slit 7. The connecting member 10 has a length equal to the interval L between centers of the bracket holes 8 and is connected to the lower ends of the first and second hinge rod units 3 and 6 at its ends by the second and fourth hinge pins 2 and 5. A pulling means is capable of pulling the ends of the connecting member 10 into the bracket holes 8 when an impact is applied to the hood 51. A linking means links the ends of the first and second hinge rod units 3 and 6 and the ends of the connecting member 10 to the fender apron "FA".

The linking means comprises two links 11 and a base bracket 13. Upper ends of the links 11 are respectively and firmly connected to the ends of the connecting member 10. The base bracket 13 is fixed on the fender apron "FA" and is connected to the lower ends of the links 11 by two bolts 12. According to this embodiment, because the links 11 are respectively and firmly connected to the base bracket 13 at their lower ends, the links 11 are kept upright when the hood 51 is opened or closed, while the links 11 are rotated around the bolts 12 when the pulling means pulls the connecting member 10.

The pulling means comprises engaging notches 14, an engaging arm 16, a driving unit 18, an impact sensor 19 and an ECU(20; Electronic Control Unit). The engaging notches 14 are respectively formed on upper and lower portions of the connecting member 10. The engaging arm 16 is provided with engaging projections 15 at its ends. The driving unit 18, such as a motor, generates driving force to pull the connecting member 10 and is connected to the connecting member 10. The impact sensor 19, such as a strain gauge, is mounted on the hood 51 and senses an impact to the hood 51. The ECU(20) operates the driving unit 18 in response to the signal from the impact sensor 19.

Figure 4:
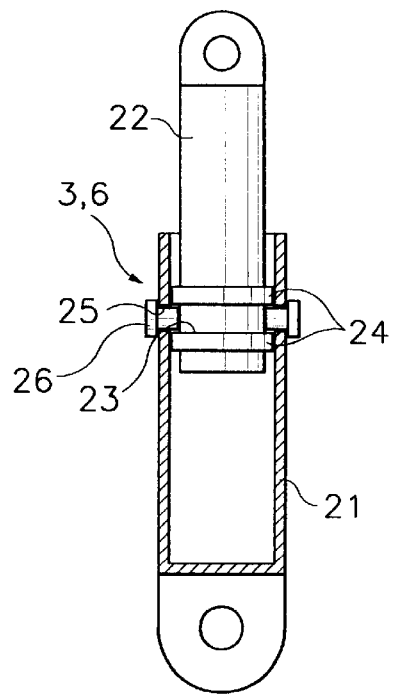
FIG. 4 is a partial cross section showing the cylinder of FIG. 1*a*.
Figure 5:
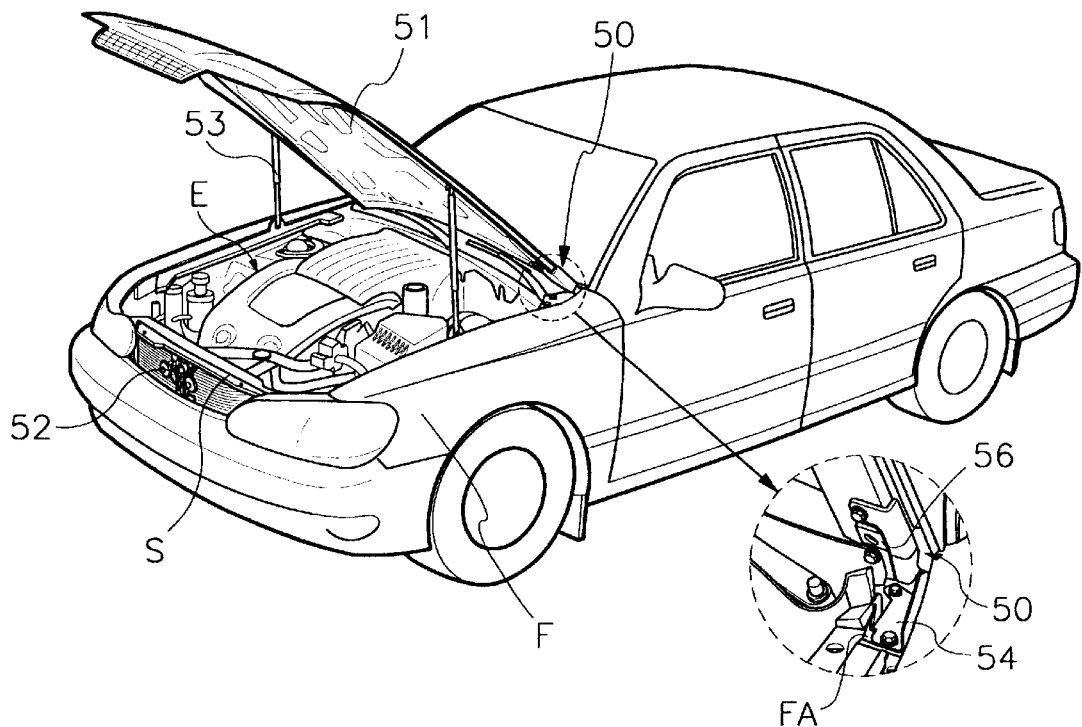
FIG. 5 is a perspective view showing the installation of a conventional hinge assembly.
Figure 6:
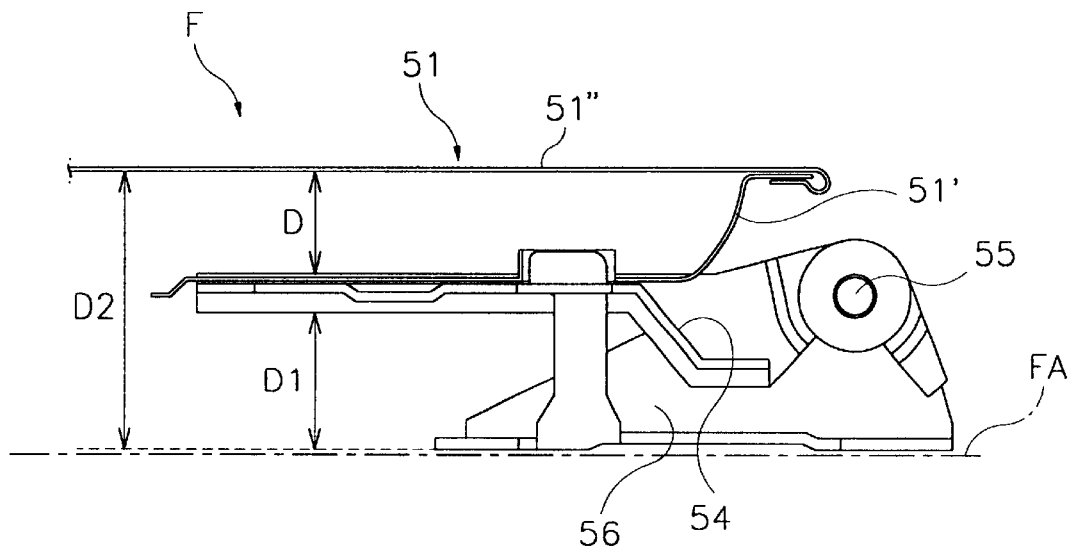
FIG. 6 is an enlarged cross section showing the hood hinge assembly of FIG. 5 when a hood is closed.

Referring to FIG. 4, each of the first and second hinge rod units 3 and 6 comprises a first hollow hinge rod 21, a second hinge rod 22 slidably inserted into the first hinge rod 21, and means for locking the second hinge rod 22 to the first hinge rod 21. The means for locking the second hinge rod 22 to the first hinge rod 21 is breakable when a force greater than a predetermined certain amount is applied. When the driving unit 18 pulls the connecting member 10, the first hinge rods 21 of the first and second hinge rod units 3 and 6 are respectively separated from the second hinge rods 22, thus improving the impact absorbing capability.

The locking means comprises two ridges 24 and locking pins 26. The ridges 24 are formed around the lower portion of the first rod 22 and define a valley 23. The locking pins 26 are made of plastic and are inserted to the valley 23 through holes 25. When the pulling means pulls the connecting member 10, the first and second rod units 3 and 6 connected to the connecting member 10 are pulled. At this time, the first hinge rods 21 are respectively separated from the second rods 22 and, consequently, the first and second hinge rod units 3 and 6 may not support the hood 51, thus allowing the hood 51 to be lowered and improving the impact absorbing capability.

The operation of an embodiments is described in the following.

When a user opens the hood 51, the first and second hinge rod units 3 and 6 are rotated around the first, second, third and fourth hinge pins 1, 2, 4 and 5. At this time, the connecting member 10 firmly connected to the first and second hinge rod units 3 and 6 is not moved. As the first and second hinge rod units 3 and 6 are rotated, the hood 51 is moved to the front by the difference between the lengths of the first and second hinge rod units 3 and 6 or the difference between the first interval "C" and the second interval "C1" and opened.

When the hood 51 is closed, the hood 51 is vertically spaced apart from the fender apron "FA" by "C2" of the difference between the lengths of the first and second hinge rod units 3 and 6 or the difference between the first interval "C" and the second interval "C1", thus enlarging the space into which the hood 51 is moved.

When the hood 51 is opened or closed, the ends of the connecting member 10 are away from the bracket holes 8.

When a pedestrian collides with the hood 51, the hood 51 is lowered and crushed, thus absorbing an impact. At this time, since the hood 51 is lowered and crushed by the space "C2", the impact absorbing capability is improved compared to the prior art.

Additionally, when the impact force is greater than a predetermined certain amount, the locking pins 26 locking the second hinge rods 22 to the first hinge rods 21 are broken and the second hinge rods 22 are unlocked. The second hinge rods 22 may then enter farther into the first hinge rods 21. Therefore, the lengths of the first and second hinge rod units 3 and 6 are reduced, thereby absorbing the impact.

In the meantime, when the pedestrian collides with the hood 51, the impact sensor 19 senses the impact and transmits a signal. In response to the signal, the ECU 20 receives this signal and operates the driving unit 18. The driving unit 8 pulls the arm 16, thus pulling the connecting member 10. When the connecting member 10 is pulled, the first hinge rods 21 of the first and second hinge rod units 3 and 6 continue to be connected to the hood 51, while the second hinge rods 22 are moved along with the connecting member 10. When the connecting member 10 arrives at a position over the bracket holes 8, the connecting member 10 collapses through the bracket holes 8 and is moved under the base bracket 13. At this time, the links 11 are rotated while the bolts 12 are secured to the links 11. Because the connecting member 10 is pulled by a relatively great force, the force generated by the bolts 13 is overcome and the connecting member 10 may be rotated. Because the bracket holes 8 have lengths allowing the links 11 to pass through, the connecting member 10 may collapse through the bracket holes 8 and the slit 7.

In brief, because an impact is firstly absorbed while the hood 51 is lowered and crushed by the space "C2" and the impact is secondly absorbed while the second hinge rods 22 inserted into the first hinge rods 21 and the first hinge rods 21 collapse through the bracket holes 8, most of the impact is absorbed through these actions, thereby allowing the shock transmitted to a pedestrian to be reduced compared with the prior art.

As described above, the present invention provides a hinge assembly for automobile hoods, reducing a shock applied to a pedestrian by absorbing an impact applied to the hood.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A hinge assembly for an automobile having a hood and a fender apron comprising:

a first hinge rod unit having upper and lower ends, the first hinge rod unit for being rotatably engaged at the upper end with a bottom of the hood with a first hinge pin and for being rotatably engaged at the lower end with the fender apron with a second hinge pin; and a second hinge rod unit having upper and lower ends, the second hinge rod unit for being rotatably engaged at the upper end with the bottom of the hood with a third hinge pin and for being rotatably engaged at the lower end with the fender apron with a fourth hinge pin;

wherein the third hinge pin is spaced apart from the first hinge pin by a first interval and the fourth hinge pin is spaced apart from the second hinge pin by a second interval longer than the first interval; and wherein each of the first and second hinge rod units comprises:
   a first hollow hinge rod;
   a second hollow hinge rod; and
   a breakable lock holding the second hinge rod to the first hinge rod, the lock being breakable when subjected to a force greater than a predetermined force.

2. A hinge assembly according to claim 1, wherein the first hollow hinge rod comprises a hole and the lock comprises:

two ridges formed around the second hollow rod, the two ridges defining a valley, and a locking pin inserted into the valley through the hole in the first hollow hinge rod.

3. A hinge assembly according to either of claims 1 or 2, further comprising a collapser mountable between the lower ends of the first and second hinge rod units and the fender apron that absorbs an impact by lowering the first and second hinge rod units when an impact is applied to the hood.

4. A hinge assembly according to claim 3, wherein the collapser comprises:

a support bracket having a portion spaced apart from the fender apron, the portion having a slit and two spaced-apart bracket holes at the slit;

a connecting member having a length equal to an interval between centers of the bracket holes, the connecting member being firmly connected to the lower ends of the first and second hinge rod units by the second and fourth hinge pins;

a puller pulling the connecting member into the slit when an impact is applied to the hood; and at least one link linking the first and second hinge rod units and the connecting member to the fender apron.

5. A hinge assembly according to claim 4, wherein the at least one link comprises:

at least two links, each of the at least two links having upper and lower ends, the upper ends of each of the at least two links being connected to the connecting member; and a base bracket fixable on the fender apron connected to the lower ends of each of the at least two links.

6. A hinge assembly according to claim 4, wherein the puller comprises:

engaging notches formed on the connecting member;

an engaging arm having engaging projections;

a driving unit connected to the connecting member for generating driving force to pull the connecting member;

an impact sensor for sensing an impact to the hood, mounted on the hood; and an electronic control unit operating the driving unit in response to a signal of the impact sensor.

7. A hinge assembly according to claim 4, wherein the puller comprises:

engaging notches formed on the connecting member;

an engaging arm having engaging projections connected to the connecting member;

a driving unit connected to the engaging arm for generating driving force to pull the connecting member; an impact sensor for sensing an impact to the hood, mounted on the hood; and an electronic control unit operating the driving unit in response to a signal of the impact sensor.

8. A hinge assembly for an automobile comprising:

a hood;

a fender;

a first hinge rod unit having upper and lower ends, the first hinge rod unit being rotatably engaged at the upper end with a bottom of the hood with a first hinge pin and being rotatably engaged at the lower end with the fender apron with a second hinge pin; and a second hinge rod unit having upper and lower ends, the second hinge rod unit being rotatably engaged at the upper end with the bottom of the hood with a third hinge pin and being rotated engaged at the lower end with the fender apron with a fourth hinge pin;

wherein the third hinge pin is spaced apart from the first hinge pin by a first interval and the fourth hinge pin is spaced apart from the second hinge pin by a second interval longer than the first interval; and wherein each of the first and second hinge rod units comprises:
   a first hollow hinge rod;
   a second hollow hinge rod; and
   a breakable lock holding the second hinge rod to the first hinge rod, the lock being breakable when subjected to a force greater than a predetermined force.

9. A hinge assembly for an automobile having a hood and a fender apron comprising:

a first hinge rod unit having upper and lower ends, the first hinge rod unit for being rotatably engaged at the upper end with a bottom of the hood with a first hinge pin and for being rotatably engaged at the lower end with the fender apron with a second hinge pin;

a second hinge rod unit having upper and lower ends, the second hinge rod unit for being rotatably engaged at the upper end with the bottom of the hood with a third hinge pin and for being rotatably engaged at the lower end with the fender apron with a fourth hinge pin; and a collapser mountable between the lower ends of the first and second hinge rod units and the fender apron that absorbs an impact by lowering the first and second hinge rod units when an impact is applied to the hood;

wherein the third hinge pin is spaced apart from the first hinge pin by a first interval and the fourth hinge pin is spaced apart from the second hinge pin by a second interval longer than the first interval.

10. A hinge assembly according to claim 9, wherein the collapser comprises:

a support bracket having a portion spaced apart from the fender apron, the portion having a slit and two spaced-apart bracket holes at the slit;

a connecting member having a length equal to an interval between centers of the bracket holes, the connecting member being firmly connected to the lower ends of the first and second hinge rod units by the second and fourth hinge pins;

a puller pulling the connecting member into the slit when an impact is applied to the hood; and at least one link linking the first and second hinge rod units and the connecting member to the fender apron.

11. A hinge assembly according to claim 10, wherein the at leat one link comprises:

at least two links each of the at least two links having upper and lower ends, the upper ends of each of the at least two links being connected to the connecting member; and a base bracket fixable on the fender apron connected to the lower ends of each of the at least two links.

12. A hinge assembly according to claim 10, wherein the link puller comprises:

engaging notches formed on the connecting member;

an engaging arm having engaging projections;

a driving unit connected to the connecting member for generating driving force to pull the connecting member;

an impact sensor for sensing an impact to the hood, mounted on the hood; and an electronic control unit operating the driving unit in response to a signal of the impact sensor.

* * * * *

UNITED STATES PATENT AND TRADEMARK OFFICE
CERTIFICATE OF CORRECTION

PATENT NO.     : 6,330,734 B1
DATED          : December 18, 2001
INVENTOR(S)    : Sun-Hyung Cho It is certified that error appears in the above-identified patent and that said Letters Patent is hereby corrected as shown below:

Column 8,
Line 2, replace "leat" with -- least --.
Line 12, before "puller" delete "link".

Signed and Sealed this

First Day of July, 2003

JAMES E. ROGAN
*Director of the United States Patent and Trademark Office*